US006542521B1

(12) United States Patent
Fjørtoft et al.

(10) Patent No.: US 6,542,521 B1
(45) Date of Patent: Apr. 1, 2003

(54) METHOD FOR IMPROVING SERVICE LEVEL SELECTION IN A COMMUNICATION NETWORK SYSTEM

(75) Inventors: Jarle Fjørtoft, Oslo (NO); Erik A. Colban, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/369,175

(22) Filed: Aug. 5, 1999

(30) Foreign Application Priority Data

Aug. 7, 1998 (NO) .......................................... 19983638

(51) Int. Cl.$^7$ ............................... H04J 3/12; H04J 3/22
(52) U.S. Cl. ...................................... 370/522; 370/465
(58) Field of Search ............................... 370/310, 310.1, 370/310.2, 321, 328, 329, 330, 331, 332, 333, 337, 347, 442, 465, 468, 469, 470, 471, 472, 473, 474, 458, 338

(56) References Cited

U.S. PATENT DOCUMENTS

| 5,194,873 | A | * | 3/1993 | Sickles | 342/374 |
| 5,726,764 | A | * | 3/1998 | Averbuch | 358/403 |
| 6,118,834 | A | * | 9/2000 | Rasanen | 375/372 |
| 6,192,055 | B1 | * | 2/2001 | Rasanen | 370/465 |
| 2001/0043588 | A1 | * | 11/2001 | Sallberg | 370/352 |

FOREIGN PATENT DOCUMENTS

| WO | WO96/10305 | 4/1996 |
| WO | WO96/18248 | 6/1996 |

OTHER PUBLICATIONS

Digital Cellular Telecommunications System (Phase 2+); High Speed Circuit Switched Data (HSCSD)—Stage 2 (GSM 03.34) TS 101 038 V5.0.1, pp. 1–20, (Apr. 1997).

Digital Cellular Telecommunications System (Phase 2+); Rate Adaption On The Mobile Station—Base Station System (MS–BSS) Interface (GSM 04.21 version 5.3.0) European Telecommunication Standard, pr ETS 300 945, pp. 1–38, (Nov. 1997).

Digital Cellular Telecommunications System (Phase 2+); Radio Link Protocol (RLP) For Data And Telematic Services on the Mobile Station—Base Station System (MS–BSS) Interface and the Base Station System—Mobile—Service Switching Centre (BSS–MSC) Interface (GSM 04.22 Version 5.3.0), European Telecommunication Standard, pr ETS 300 946, pp. 1–64, (Nov. 1997).

Digital Cellular Telecommunications System (Phase 2+); General Requirements on Interworking Between the Public Land Mobile Network (PLMN) and the Integrated Services Digital Network (ISDN) or Public Switched Telephone Network (PSTN) (GSM 09.07 version 5.6.0), European Telecommunication Standard, pr ETS 300 976, pp. 1–67, (Feb. 1998).*

Digital Cellular Telecommunications System (Phase 2+); High Speed Circuit Switched Data (HSCSD)–Stage 2 (GSM 03.34) TS 101 038 V5.01, pp. 1–20, dated Apr. 1997.*

* cited by examiner

Primary Examiner—Dang Ton
Assistant Examiner—Robert W. Wilson

(57) ABSTRACT

The present invention relates to a method for improving service level selection in a communication network system, in which an interworking function (IWF) is arranged between a user terminal (MS) and the network(s) in question, and wherein High Speed Circuit Data (HSCD) are specified, and for the purpose of making this selection in a more expedient manner and allow the user to allocate bandwidth in a more flexible and dynamic way, it is according to the present invention suggested that the interworking function (IWF) is used for signalling to the user terminal (MS) when a change in level selection may be useful.

20 Claims, 3 Drawing Sheets

US 6,542,521 B1

METHOD FOR IMPROVING SERVICE LEVEL SELECTION IN A COMMUNICATION NETWORK SYSTEM

FIELD OF THE INVENTION

The present invention relates to mobile telecommunication systems. In particular, the invention is directed to a method of improving service level selection during a data transmission in a mobile communication network.

More specifically the invention relates to High Speed Circuit Switched Data (HSCSD) calls in GSM.

TECHNICAL BACKGROUND

The Problem Area

During a non-transparent HSCSD call, the mobile station (MS) may (depending on negotiated parameters at call setup) request the network to add or remove one or more traffic channels used for the transmission (usually referred to a service level up and downgrading). This can be used to release channels during periods of the call when a small amount of data is transmitted through the mobile network, and to allocate more channels when the data flow increases.

In order to use this mechanism efficiently, the MS must know how much data is passing through the fixed network, see FIG. 1. Briefly put, if the data transmission rate in the fixed network is less than the total capacity of the allocated channels in the mobile network (i.e., the air interface user rate, AIUR), the MS should initiate a service level downgrading, if it is more, it should initiate an upgrading.

In order to know when to initiate up and downgrading, the MS must "see" beyond the mobile network; more specifically beyond the Interworking Function (IWF), see FIG. 1. In the current implementations of GSM, the MS can get an indication that the data rate in the fixed network is low compared to the AIUR. In the downlink direction, this is done by looking at the amount of data it receives and, in the uplink direction, through use of flow control. However, there are no similar indications that the data rate in the fixed network is high compared to the AIUR, meaning that the MS should initiate a service level upgrading.

Known Solutions

If the data transmission rate in the fixed network is constant and data are not compressed, the data transmission rate is known to the mobile user through the parameters negotiated at call setup. If data are compressed on the mobile leg only, the mobile user may examine the compression factor, which may vary.

If the data transmission rate in the fixed network is unpredictable, e.g., the fixed network is an IP network, the mobile user may guess when to upgrade. For instance, he may guess that an upgrade is useful immediately after starting to download a large file. He may also occasionally request an upgrade and, if that has no effect, request a subsequent downgrade.

Another solution is to let the IWF initiate the upgrading.

Problems with Known Solutions

Examining the compression factor may be intricate to implement.

Transmission of a large file does not necessarily mean that an upgrading will have any effect since the fixed network may be congested.

Upgrading and downgrading are relatively extensive and slow processes and unnecessary upgrades should be avoided. Depending on the operator's charging policy, the user may have to pay extra for each channel in use. The problem with letting the network initiate the upgrading is that this may interfere with the user's wishes. The user may want to control the upgrading more strictly due to, e.g., extra charges in connection with upgrading.

Further Prior Art

From WO 96/10305 (Nokia Telecommunications Oy) there is known a data transmission method in a time division multiple access mobile communication system. The mobile communication network can dynamically adjust the channel configuration assigned to the data call within the limits of a minimum and a maximum requirement, depending on the varying allocation level of the network resources. This functionality is, in relation to GSM standards, referred to as a minimum value of 1 and a maximum value determined by the BC-IE parameters mTCH (maximum number of TCH). In other words, such a network may initiate upgrading and downgrading, but is limited to the interval 1 through mTCH. Said standards also allow the user to change the mTCH parameter during a call, i.e., a so-called user initiated service level upgrading and downgrading.

However, this prior art does not give any instructions for giving a user terminal, and more specifically a mobile station, a "hint" about increasing the value of said mTCH.

OBJECTS OF THE INVENTION

An object of the invention is thus to provide a method wherein the service level upgrading and downgrading can be affected in a far more effective and expedient manner, as compared with prior art.

Another object of the present invention is to provide a method for improving service level selection making it possible for the mobile user to allocate bandwidth in a more flexible way, especially for circuit switched data calls in a mobile network.

Still another object of the present invention is to provide a method wherein it is possible for the mobile user to allocate required bandwidth more dynamically, for thereby reducing costs involved therein.

Yet another object of the invention is to provide a method by which the upgrading and downgrading of number of traffic channels used can be made at any time during a call, and more selectively depending on the required transmission capacity.

Still another object of the present invention is to provide a method which can be used in an advantageous manner in network communication systems having a bursty traffic, for example in connection with internet and intranets.

BRIEF SUMMARY OF THE INVENTION

Thus, in one aspect, the present invention is a method of improving service level selection in a communication system having a mobile network and a fixed network. An interworking function (IWF) is arranged between the fixed network and a mobile station (MS) operating in the mobile network, and High Speed Circuit Switched Data (HSCSD) services are provided to the MS utilizing at least one traffic channel in the mobile network. The method includes the steps of establishing a HSCSD session in which data is exchanged between the fixed network and the MS; and determining by the IWF whether a data rate in the fixed network differs significantly from an Air Interface User Rate (AIUR) in the mobile network. Upon determining that the data rate in the fixed network differs significantly from the AIUR, the IWF sends an indication to the MS recommending a change in service level selection. This is followed by sending a request from the MS to the mobile network to change the service level selection; and adding or removing traffic channels to the HSCSD session by the mobile network, in accordance with the request from the MS.

Generally, the solution according to the present invention is to let the Interworking Function (IWF) signal to the mobile user when an upgrade or downgrade may be useful.

Further features and advantages of the present invention, as well as the implementation thereof, will appear from the following description taken in conjunction with the appending drawings, as well as from the attached patent claims.

BRIEF DISCLOSER OF THE DRAWINGS

DETAILED DESCRIPTION OF EMBODIMENTS

Figure 1:
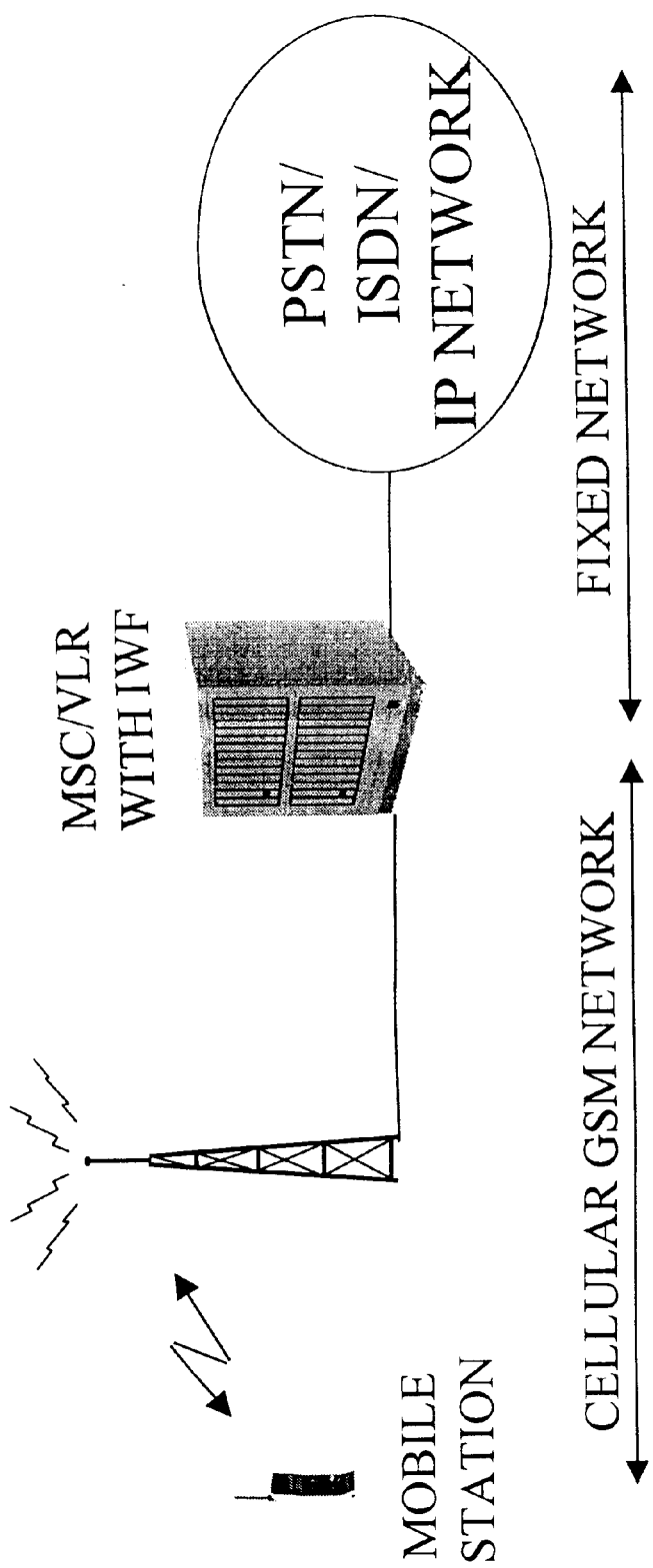
FIG. 1 is a schematic drawing illustrating the general layout of a communication network system, wherein the present invention can find its application.

In FIG. 1 there is illustrated an embodiment of a communication network system wherein the present invention can be embodied. Although the following description is made in relation to this example of a communication network system comprising a mobile station and an associated cellular GSM network communicating with a fixed network, for example a PSTN, ISDN or IP network, through an MSC/VLR with Inter-working Function (IWF), it is to be understood that the present invention can be used also in other cellular radio network systems, and satellite networks where the principles of High Speed Circuit Switched Data are specified.

Figure 2:
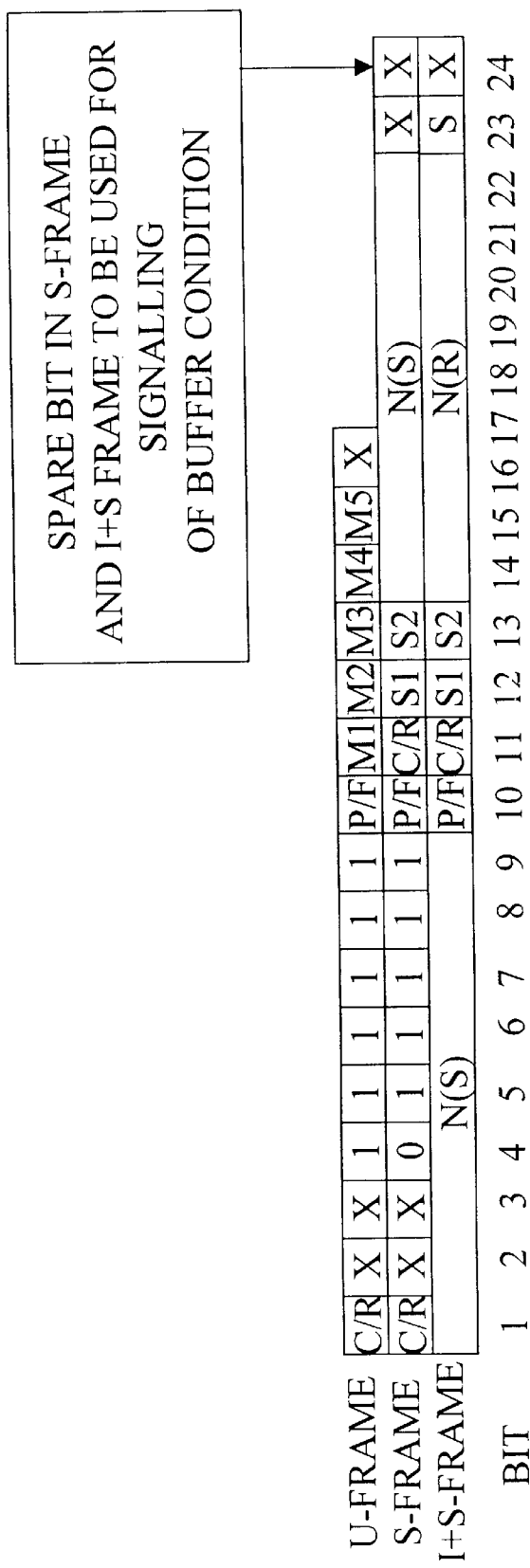
FIG. 2 illustrates Radio Link Protocol header formats modified to comply with an example of an embodiment of the present invention.

Now, referring to the enclosed FIG. 2 a more specific embodiment of the present invention will be discussed in more detail.

The proposed solution to the problem is to let the IWF signal to the mobile user when an upgrade may be useful. Setting the last bit in the Radio Link Protocol (RLP) information or supervisory frame header (currently spare) to 1, can be used to signal this, See FIG. 2. The 1 is repeated in subsequent information and supervisory frames until upgrading takes effect (i.e. the IWF is transmitting RLP frames towards the MS on at least one additional channel) or until the IWF no longer recommends an upgrade.

Figure 3:
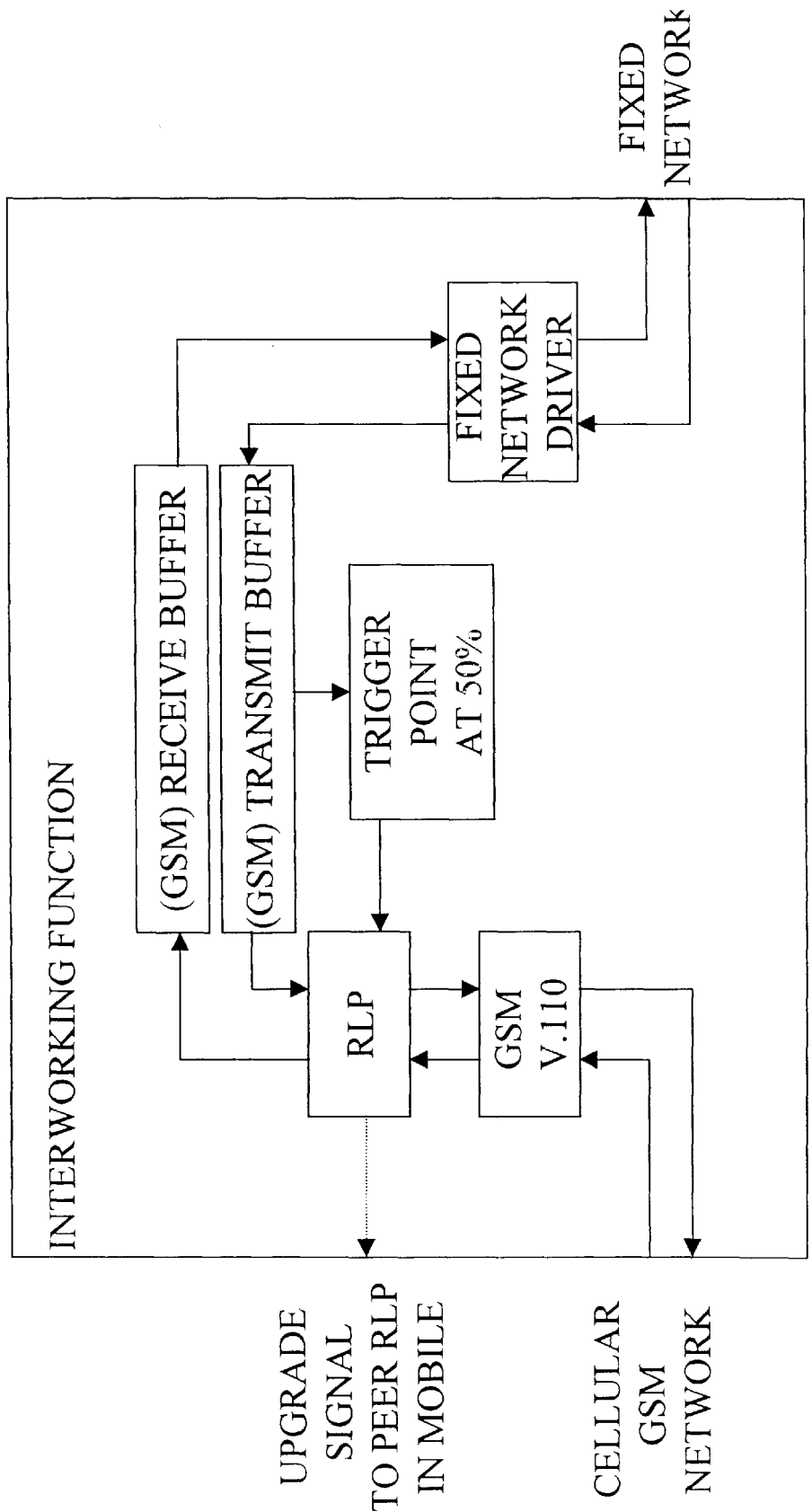
FIG. 3 is a block diagram illustrating an embodiment of an interworking function with buffer monitoring, in accordance with the present invention.

The IWF can use the status of the buffers between the protocols on the mobile side and the protocols on the fixed network side to base its suggestion for upgrading, see FIG. 3. If the transmit buffer in the downlink direction, i.e. towards the mobile station, is filling up, it means that the data rate is higher on the fixed network side than on the mobile side. The IWF signals to the MS to upgrade if e.g., the buffer is more than 50% full, or alternatively, if the buffer fill level is increasing above a certain rate. If the receive buffer, in the uplink direction i.e. from the mobile station, is empty or getting empty at a fast rate, this means that the data rate is higher on the fixed network side than on the mobile side. The IWF signals to the MS to upgrade if, e.g., the receive buffer is empty and it is receiving no or very few idle frames from the MS.

In case an MS does not have this feature implemented (i.e., does not care about the last bit in the header of the information and supervisory frames), there is no impact. If an IWF does not have this feature implemented, but the MS has, there may be some misunderstanding. In order to avoid this, the IWF transmits a specific sequence in the last bit position of the header of the k first information frames it sends to the MS, where k is e.g. the window size used downlink. In this way the MS can identify IWFs that support the feature. Alternatively this capability can be negotiated between the MS and the IWF at the setup of the call by using existing RLP negotiation mechanisms.

ADVANTAGES

The functionality proposed in this invention disclosure makes it possible for the mobile user to allocate bandwidth in a more flexible way, for circuit switched data calls in a mobile network. It makes it possible for the mobile user to allocate required bandwidth more dynamically, to reduce costs. An MS that implements the functionality described, will be able to upgrade and downgrade the number of traffic channels used, depending on the required transmission capacity at any one time during a call. For access to Internet and Intranets this will be a big advantage as the characteristics of the traffic is bursty.

The proposed solution is simple to implement on the IWF side. The signal is also easily retrievable on the MS side. The actual handling of the signal depends on how intricate the logic for up and downgrading in the MS is. The MS may simply ignore it, follow the suggestion blindly, or balance it against other criteria for up and downgrading. In any case the MS is in control. The time for the signal to reach the MS is also minimal (equal to the transmission delay between the IWF and the MS). The solution is also backward compatible, meaning that the solution will not have any impact on an MS or IWF that does not implement this feature.

BROADENING

Alternative means of transmitting the information from the IWF to the MS can be used, e.g., USSD. Although this may be more complicated, it may allow more information (e.g., how fast the buffers are filling up) to be passed between the IWF and the MS providing better grounds for the MS to make a decision on whether to upgrade or not. The invention applies equally well to other cellular radio networks systems, and satellite networks where the principles of High Speed Circuit Switched Data are specified.

REFERENCES AND ABBREVATIONS

High Speed Circuit Switched Data Ref. WO.9618248 and GSM 03.34 "Digital cellular telecommunications system (Phase 2+); High Speed Circuit Switched—Stage 2 Service Description.

AIUR Air Interface User Rate Ref. GSM 04.21 "Digital cellular telecommunications system (Phase 2+);Rate Adaption on the Mobile Station-Base Station System (MS-BSS) Interface"

RLP Radio Link Protocol Ref. GSM 04.22 "Digital cellular telecommunications system (Phase 2+); Radio Link Protocol for data and telematic services on the Mobile Station—Base Station System (MS-BSS interface and the Base Station System—Mobile service Switching Centre (BSS-MSC) interface"

IWF Interworking Function Ref. GSM 09.07 "Digital cellular telecommunications system (Phase 2+); General Requirements on interworking between the Public Land Mobile Network (PLMN) and the Integrated Services Digital Network (ISDN) or Public Switched Telephone Network (PSTN)

MS Mobile Station
USSD Unstructured Supplementary Service Data
GSM Global System for Mobile Communications
MSC Mobile Swiching Centre
VLR Visitor Lacation Register
PSTN Public Switched Telephone Network
Ip internet protocol

What is claimed:

1. A method of improving service level selection in a communication system having a mobile network and a fixed network, wherein an interworking function (IWF) is arranged between the fixed network and a mobile station (MS) operating in the mobile network, and wherein high speed circuit switched data (HSCSD) services are provided to the ms utilizing at least one traffic channel in the mobile network, said method comprising the steps of:

establishing a HSCSD session in which data is exchanged between the fixed network and the MS;

determining by the IWF whether a data rate in the fixed network differs significantly from an Air Interface User Rate (AIUR) in the mobile network;

upon determining that the data rate in the fixed network differs significantly from the AIUR, sending an indication from the IWF to the MS recommending a change in service level selection;

sending a request from the MS to the mobile network to change the service level selection; and adding or removing traffic channels to the HSCSD session by the mobile network, in accordance with the request from the MS.

2. The method of improving service level selection of claim 1 wherein the step of sending an indication from the IWF to the MS recommending a change in service level selection includes setting an information bit to a predefined value in a Radio Link Protocol (RLP) signaling message sent from the IWF to the MS.

3. The method of improving service level selection of claim 1 wherein the step of sending an indication from the IWF to the MS recommending a change in service level selection includes setting a bit in a supervisory frame header to a predefined value in a Radio Link Protocol (RLP) signaling message sent from the IWF to the MS.

4. The method of improving service level selection of claim 1 further comprising the steps of:

sending an indication from the mobile network to the IWF indicating that the recommended change in service level selection has been implemented; and in response to receiving the indication from the mobile network that the recommended change in service level selection has been implemented, discontinuing sending the indication from the IWF to the MS recommending a change in service level selection.

5. The method of improving service level selection of claim 1 further comprising the steps of:

determining on a continuing basis by the IWF, whether the change in service level selection is still recommended; and upon determining that the change in service level selection is no longer recommended, discontinuing sending the indication from the IWF to the MS recommending a change in service level selection.

6. The method of improving service level selection of claim 5 wherein the step of determining whether the change in service level selection is still recommended includes determining on a continuing basis by the IWF, whether a buffer between the mobile network and the fixed network is filled above a predefined threshold level.

7. The method of improving service level selection of claim 1 wherein the IWF includes a transmit buffer that buffers data from the fixed network being transmitted to the MS, and the step of determining whether the data rate in the fixed network differs significantly from the AIUR includes determining by the IWF whether the transmit buffer is filled above a predefined threshold level.

8. The method of improving service level selection of claim 7 wherein the step of sending an indication from the IWF to the MS recommending a change in service level selection includes sending an indication to the MS recommending that traffic channels be added to the session, upon determining by the IWF that the transmit buffer is filled above the predefined threshold level.

9. The method of improving service level selection of claim 1 wherein the IWF includes a transmit buffer that buffers data from the fixed network being transmitted to the MS, and the step of determining whether the data rate in the fixed network differs significantly from the AIUR includes determining by the IWF, a filling rate at which the transmit buffer is being filled.

10. The method of improving service level selection of claim 9 wherein the step of sending an indication from the IWF to the MS recommending a change in service level selection includes sending an indication to the MS recommending that traffic channels be added to the session, upon determining by the IWF that the filling rate of the transmit buffer exceeds a predefined filling rate.

11. The method of improving service level selection of claim 1 wherein the IWF includes a receive buffer that buffers data from the MS being transmitted to the fixed network, and the step of determining whether the data rate in the fixed network differs significantly from the AIUR includes determining by the IWF whether the level of the receive buffer is below a predefined threshold level.

12. The method of improving service level selection of claim 11 wherein the step of sending an indication from the IWF to the MS recommending a change in service level selection includes sending an indication to the MS recommending that traffic channels be added to the session, upon determining by the IWF that the level of the receive buffer is below the predefined threshold level.

13. The method of improving service level selection of claim 1 wherein the IWF includes a receive buffer that buffers data from the MS being transmitted to the fixed network, and the step of determining whether the data rate in the fixed network differs significantly from the AIUR includes determining by the IWF, a depletion rate at which data is being emptied from the receive buffer.

14. The method of improving service level selection of claim 13 wherein the step of sending an indication from the IWF to the MS recommending a change in service level selection includes sending an indication to the MS recommending that traffic channels be added to the session, upon determining by the IWF that the depletion rate of the receive buffer exceeds a predefined depletion rate.

15. The method of improving service level selection of claim 1 wherein the step of establishing a HSCSD session includes sending an indication from the IWF to the MS indicating that the IWF has the capability to determine and send service level selection recommendations during the session.

16. The method of improving service level selection of claim 1 wherein the step of sending an indication from the IWF to the MS recommending a change in service level selection includes sending the indication using the Unstructured Supplementary Service Data (USSD) protocol.

17. A method of improving service level selection in a communication system having a mobile network and a fixed network, wherein an interworking function (IWF) is arranged between the fixed network and a mobile station (MS) operating in the mobile network, and wherein High Speed Circuit Switched Data (HSCSD) services are provided to the MS utilizing at least one traffic channel in the mobile network, said method comprising the steps of:

establishing a HSCSD session in which data is exchanged between the fixed network and the MS;

providing a transmit buffer in the IWF, said transmit buffer buffering data from the fixed network being transmitted to the MS;

providing a receive buffer in the IWF, said receive buffer buffering data from the MS being transmitted to the fixed network;

determining by the IWF whether a data rate in the fixed network significantly exceeds an Air Interface User Rate (AIUR) in the mobile network;

upon determining that the data rate in the fixed network significantly exceeds the AIUR, sending an indication from the IWF to the MS recommending that traffic channels in the mobile network be added to the HSCSD session;

sending a request from the MS to the mobile network to add at least one traffic channel to the session; and adding at least one traffic channel to the session by the mobile network, in accordance with the request from the MS.

18. The method of improving service level selection of claim 17 wherein the step of determining whether the data rate in the fixed network significantly exceeds the AIUR includes:

determining by the IWF whether the transmit buffer is filled above a predefined threshold level;

determining by the IWF whether a filling rate at which the transmit buffer is being filled exceeds a predefined filling rate; and concluding that the data rate in the fixed network significantly exceeds the AIUR if either the transmit buffer is filled above the predefined threshold level, or the filling rate of the transmit buffer exceeds the predefined filling rate.

19. The method of improving service level selection of claim 17 wherein the step of determining whether the data rate in the fixed network significantly exceeds the AIUR includes:

determining by the IWF whether the receive buffer is emptied below a predefined threshold level;

determining by the IWF whether the depletion rate of the receive buffer exceeds a predefined depletion rate; and concluding that the data rate in the fixed network significantly exceeds the AIUR if either the receive buffer is emptied below the predefined threshold level, or the depletion rate of the receive buffer exceeds the predefined depletion rate.

20. The method of improving service level selection of claim 17 wherein the step of sending an indication from the IWF to the MS recommending that traffic channels in the mobile network be added to the HSCSD session includes sending the indication in a Radio Link Protocol (RLP) signaling message.

\* \* \* \* \*